United States Patent
Gulbay et al.

(10) Patent No.: US 10,716,126 B2
(45) Date of Patent: Jul. 14, 2020

(54) SYSTEM AND METHOD FOR ADVANCED LOW POWER WIDE AREA NETWORK COMMUNICATIONS POWER MANAGEMENT

(71) Applicant: Dell Products, LP, Round Rock, TX (US)

(72) Inventors: Sinem Gulbay, Austin, TX (US); Carlton A. Andrews, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 105 days.

(21) Appl. No.: 16/141,533

(22) Filed: Sep. 25, 2018

(65) Prior Publication Data

US 2020/0100269 A1    Mar. 26, 2020

(51) Int. Cl.
| | |
|---|---|
| H04W 72/12 | (2009.01) |
| G06F 1/329 | (2019.01) |
| H04W 52/02 | (2009.01) |
| H04W 72/10 | (2009.01) |
| H04W 48/02 | (2009.01) |
| H04W 72/04 | (2009.01) |

(52) U.S. Cl.
CPC ....... *H04W 72/1247* (2013.01); *H04W 48/02* (2013.01); *H04W 52/0216* (2013.01); *H04W 52/0261* (2013.01); *H04W 72/048* (2013.01); *H04W 72/10* (2013.01); *G06F 1/329* (2013.01); *Y02D 70/142* (2018.01)

(58) Field of Classification Search
CPC .... G06F 1/3203; G06F 1/3206; G06F 1/3209; G06F 1/329

USPC ........................................................ 713/300
See application file for complete search history.

(56) References Cited

U.S. PATENT DOCUMENTS 10,039,141 B2 *   7/2018  Ljung ................ H04W 4/70
10,123,214 B2 *  11/2018  Egner ............... H04W 16/16
(Continued)

*Primary Examiner* — Brian T Misiura
(74) *Attorney, Agent, or Firm* — Prol Intellectual Property Law, PLLC; H. Kenneth Prol

(57) ABSTRACT

An information handling system operating a low power communications engine comprising a wireless adapter for communicating on a low power communication technology network (such as LPWAN) for receiving low power communication technology data traffic for at least one always-on remote management service for the information handling system, a controller receiving a power status of the information handling system indicating a battery power level and determining a first threshold priority level based on the battery power level, the controller executing code instructions for a low power communications engine to detect a first priority level of data traffic incoming to an active low power communication technology wireless link from a packet header designation of priority level. The controller to initiate incoming traffic limitations for incoming low power communication technology data traffic to deny immediate forwarding of the low power communication technology data traffic if the detected first priority level falls at or below the first threshold priority level, and the controller to wake a BIOS of the information handling system and forward the incoming low power communication technology data traffic to applications on the information handling system if the first priority level is above the first threshold priority level.

20 Claims, 5 Drawing Sheets

(56) References Cited

U.S. PATENT DOCUMENTS

| | | | |
|---|---|---|---|
| 10,271,260 B2* | 4/2019 | Koshy | H04W 40/06 |
| 10,277,291 B2* | 4/2019 | Gulbay | H04B 7/0452 |
| 10,313,977 B2* | 6/2019 | Cavalcanti | H04W 52/0261 |
| 10,333,807 B2* | 6/2019 | Egner | H04L 43/065 |
| 10,397,864 B2* | 8/2019 | Sambhwani | H04W 4/70 |
| 10,409,751 B2* | 9/2019 | Grobelny | G06F 13/4291 |
| 10,454,867 B2* | 10/2019 | Tyagi | C07D 277/28 |
| 10,509,454 B2* | 12/2019 | Montero | G06F 11/3058 |
| 2018/0167825 A1* | 6/2018 | Egner | H04W 16/16 |
| 2018/0184360 A1* | 6/2018 | Cavalcanti | H04W 52/0261 |
| 2018/0212844 A1* | 7/2018 | Quinn | H04L 41/0823 |
| 2018/0332486 A1* | 11/2018 | Arab | H04W 24/04 |
| 2019/0045034 A1* | 2/2019 | Alam | H04L 67/12 |
| 2019/0098579 A1* | 3/2019 | Cha | H04W 52/0261 |
| 2019/0132195 A1* | 5/2019 | Nakanishi | H04L 41/0677 |

* cited by examiner

SYSTEM AND METHOD FOR ADVANCED LOW POWER WIDE AREA NETWORK COMMUNICATIONS POWER MANAGEMENT

FIELD OF THE DISCLOSURE

The present disclosure generally relates to a method and apparatus for communication power management for always-on communications through a low power wide area network (LPWAN) radio system and front end used with information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. For wireless communications, one or more wireless interface adapters may be used including antenna systems, a front end antenna module and other radio frequency subsystems. Always-on operation may provide for an information handling system to enter one or more sleep states but still be in communications, via an LPWAN radio system for example, with security and management solutions that in function and protection of the information handling system via remotely located services. Users may choose from among several available radiofrequency communication platforms in information handling systems for data and other communications with other data networks and remote services, including LPWAN communications during always-on operation for remote services such as for security and manageability.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION OF THE DRAWINGS

Figure 1:
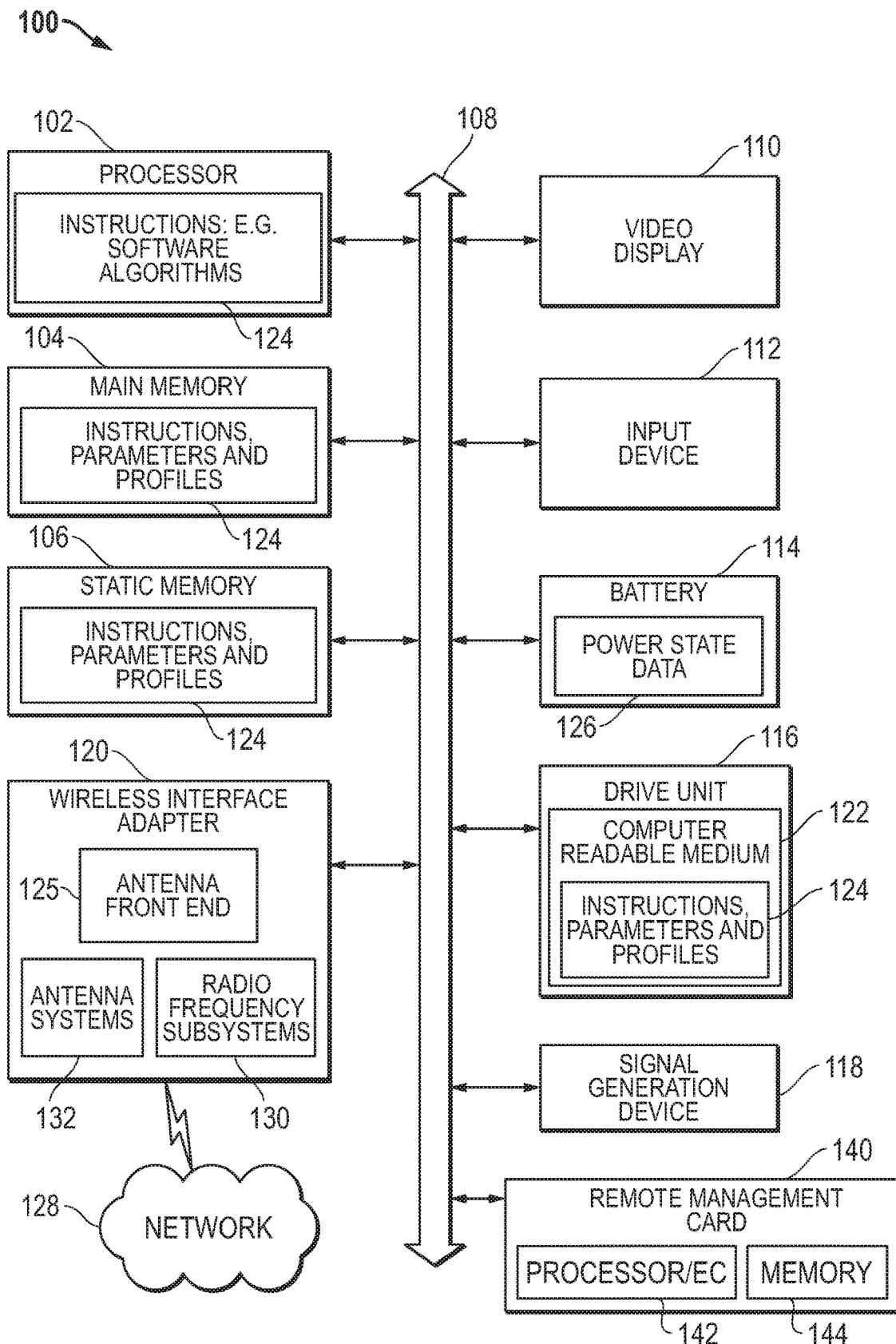
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system may be of a variety of models and types. For example, a personal computer may be a laptop, a 360 convertible computing device, a tablet, smart phone, wearable computing device, or other mobile information handling system and may have several configurations and orientation modes. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. In an aspect, the information handling system may have a plurality of antenna systems for communication via wireless links operating on a variety of radio access technologies (RAT). In one aspect, a low power, always-on wireless link connectivity may be established even during powered-down sleep states of an information handling system, such as with low power communications technologies including low-power wireless local area network (LPWAN), LoRa communication technology, Sigfox, or similar to provide some level of connectivity. In another aspect, several antenna systems may be available for each RAT to enable aggregated data communications such as via plural multiple in, multiple out (MIMO) streams to enhance bandwidth or reliability. Antenna systems may be operated via one or more wireless adapters that may include controllers, memory and other subsystems some of which may operate as a radio frequency (RF) front end for one or more antenna system to transmit wirelessly. In some aspects, the central processor and main operating systems may not need to be operating for wireless communications. Portions of an information handling system may themselves be considered information handling systems.

Always-on security and manageability solutions require information handling systems to be always connected, even during dormant or semi-dormant states such as sleep states. Such always-on security and manageability services and solutions provide for information technology (IT) management and control over individual information handling systems for many purposes including for security purposes. IT managers may utilize such services and solutions, for example, to manage and maintain multiple information handling systems within an organization.

Always-on accessibility may be highly valued by IT managers, users, and other customers of such services. Considerations of battery life impacts of always-on connected radios must be considered. Despite the low power consumption of emerging low power communication technologies, such as LPWAN, Narrow-band IoT, LTE Machine Type Communications (LTE-MTC, for example LTE Cat M1), LoRa, Sigfox, penalization against battery life with enabled always-on radio connectivity should be minimized. One way of managing battery life impacts includes management of bringing up or waking up a central processor and operating system of an information handling system when incoming messages are received via the always-on low power communication technologies radio connection.

In an example embodiment of the present disclosure, waking up the operating system for in-band applications or by out-of-band applications may be limited to when only necessary based on incoming traffic characteristics. In other aspects, waking up the operating system may also be based on power state of the information handling system in other embodiments. By applying traffic management in an out-of-band environment, control over wake-up events for in-band applications or out-of-band applications may be realized to reduce overall system power consumption. A low power communications engine is taught that may detect incoming low power communication technology data traffic priority levels assigned to incoming data and compare those to one or more priority threshold levels implemented at battery levels designated in a low power communication technology data traffic limitation policy. In such a way, the low power communications engine may determine what low power communication technology data traffic limitations may be applied to avoid waking the operating system according to embodiments of the present disclosure.

In at least some embodiments of the present disclosure, traffic prioritization of messages received via low-power signals may occur based on priority levels assigned to the incoming traffic from cloud agents of always-on management or security solutions. A low power communication engine may operate in the out-of-band environment to determine priority levels and apply policy to wake an information handling system operating system depending on power state and received priority levels. The wake policy may change dynamically depending on power state of the information handling system in some embodiments. Traffic below a priority threshold level in some embodiments may be stored for later conveyance to the operating system and applications upon the information handling system being woken up by a user or for other reasons. In other embodiments, some low priority traffic may be discarded.

FIG. 1 shows an information handling system 100 capable of administering each of the specific embodiments of the present disclosure. The information handling system 100 can represent the mobile information handling systems 210, 220, and 230 or servers or systems located anywhere within network 250 of FIG. 2, including the remote data centers operating virtual machine applications. Information handling system 100 may represent a mobile information handling system associated with a user or recipient of intended wireless communication. A mobile information handling system may execute instructions via a processor for a low power communications engine in an out-of-band system environment including priority assessment of messages incoming on low power communication technology wireless links according to embodiments disclosed herein. The application programs communicating or otherwise operating via concurrently wireless links may operate in some example embodiments as software, in whole or in part, on a mobile information handling system while other portions of the software applications may operate on remote server systems. The low power communications engine of the presently disclosed embodiments may operate as firmware, software, or hardwired circuitry or any combination on controllers or processors within the information handling system 100 or some of its components. For example, the low power communications engine of embodiments herein may operate via processor or control logic and memory on a remote management card 140 having a processor or embedded controller (EC) 142 and memory 144, on a wireless interface adapter 120 including an embedded controller or processor logic, or on some combination. Some or all of the remote management card 140 or a wireless interface adapter 120 or any portion of either may be integrated with a motherboard or may be separate boards within information handling system 100.

Information handling system 100 may also represent a networked server or other system and administer aspects of the cloud agents of always-on management or security solutions via instructions executed on a processor according to various embodiments herein involving remote operation of such systems. Such cloud agents or remotely located always-on management or security solutions may transmit messages and data via the low-power, always-on radiofrequency signals from base station transmitters via low power communication technology.

The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or a cathode ray tube (CRT). Display 110 may include a touch screen display module and touch screen controller (not shown) for receiving user inputs to the information handling system 100. Touch screen display module may detect touch or proximity to a display screen by detecting capacitance changes in the display screen as understood by those of skill. Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, a 360 degree convertible device, a wearable computing device, or a mobile smart phone.

The information handling system 100 can include a set of instructions 124 that can be executed to cause the computer system to perform any one or more of the methods or computer based functions disclosed herein. For example, instructions 124 may include operating systems or in-band software applications which utilize one or more wireless links for wireless communications via the wireless interface adapter or receive messaging via low power wireless connections. Such instructions 124 may operate other aspects or components of an information handling system. Similarly, instructions 124 may be executed as part of in-band operations responsive to low power communications for always-on management or security solutions that may receive messages and requiring activity or responses with varying levels of priority as disclosed herein from monitored low power wireless links in various embodiments. The low power communications engine operating within an out-of-band environment in some embodiments may utilize processing resources of a remote management card 140 or of a low power wireless interface adapter 120. The low power communications engine may operate as firmware on a controller or software on a processor within the remote management card 140, the wireless interface adapter device 120, or some combination and utilize low power wireless connectivity for communications. The low power communications engine receives low power wireless data communications from network 128, such as through various low power communication technology protocols, via the low power antenna system 132 and antenna front end 125 as described in the present disclosure. The firmware or software of the low power communications engine operating on a controller or processor may determine power status from power state data 126 and message priority levels from received low power communication technology data packets. The low power communications engine implements a policy for waking information handling system 100 to pass messaging to in-band applications such as instructions 124 operating via processor 102 and memory 104 or by passing low power communication technology messaging to out-of-band applications that may wake processor 102 of information handling system 100 to handle commands or requests as needed.

Wireless interface device 120 may include an embedded processor, controller, or access to other processing not requiring the entire CPU 102 and information handling system to wake up to a high-power, high operation state in some embodiments of a low power communication technology connected system. The wireless interface device 120 may include radiofrequency subsystems 130 including controllers, a processor, or other logic to implement operation of a low power communications engine according to some embodiments herein. In other embodiments, controllers, a processor, or other logic may be accessed for operation in an out-of-band operation environment for operations of the low power communications engine such as on remote management card 140 having processor or embedded controller 142. Further, the wireless interface device 120 or remote management card 140 may have or may access a memory for storing received low power messages not deemed for elevation to internal applications until an information handling system 100 otherwise wakes up according to some embodiments. Such a system may provide for out-of-band operation for background or limited operation to enable the information handling system 100 to be always-connected, such as via a low power communication technology wireless protocol and to conduct some communications and processing while in a sleep state or under low power state conditions.

In an example embodiment, out-of-band operation for management or security may be conducted with systems such as Dell® Command/Intel vPro Out-of-band operation or Dell Management Engine systems for information handling systems. Such a system may provide for out-of-band management by IT professionals to remotely manage client systems regardless of power state of those client systems. Such a Dell Command/Intel vPro Out-of-band system or Dell Management Engine systems may operate for indications for client selection, monitoring of client systems, and diagnosis of client systems as well as managing client configurations for power profiles, boot order, BIOS settings and passwords and the like. Additional operations and provisioning as well as health and operation monitoring may be conducted. In other example embodiments, remote management may be conducted by enterprise mobility management system such as VMWare's AirWatch®. Airwatch may operate on a managed information handling system as an in-band application in some embodiments. Management of multiple devices within an organization for security or operation management may be conducted via a single management console and some types of communications may be conducted through low power wireless communications messaging such as through low power communication technology. Airwatch may alert managed information handling systems to wake up and implement in-band AirWatch application operations in some embodiments. According to various embodiments herein, a low power communications engine may assess incoming messages on low power wireless links, such as low power communication technology links, and determine priority levels assigned to those messages. Priority levels are assigned to those data packets comprising messages by the sending always-on management or security solutions, such as those listed above, and used in determining to trigger an embedded controller to wake up a BIOS of a receiving information handling system 100 by passing the messages for further processing. Further, the always-on management or security solutions, such as Dell Command/Intel vPro Out-of-band, Dell Management Engine, or AirWatch solutions, may also operate on information handling systems 100 for remote connectivity to the receiving information handling systems in other embodiments. For example, the always-on management or security solutions may operate via one or more cloud agent devices to provide low power communications for management, monitoring, provisioning, updating, security and other tasks desired to occur by IT management of enterprise mobility management, server system management, or the like within organizations deploying multiple, networked information handling systems.

Various software modules comprising software application instructions 124 or firmware instructions may be coordinated by an operating system (OS) and via an application programming interface (API). An example operating system may include Windows®, Android®, and other OS types known in the art. Example APIs may include Windows API/Win 32, Core Java API, or Android APIs. In a further example, processor 102 may conduct monitoring and processing of information handling system usage trends, provisioning, updates, security applications according to the systems and methods disclosed herein. The computer system 100 may operate as a standalone device or may be connected such as using a network, to other computer systems or peripheral devices. For example, a cloud client information handling system may provide for always-on management or security solutions to managed information handling systems in low-power states as well as when the managed information handling systems are fully awake and operating via an active processor 102 and the main operating system.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a tablet computer, a laptop computer, a desktop computer, a communications device, a wireless smart phone, wearable computing devices, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Further, the instructions 124 may embody one or more of the methods or logic as described herein.

In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the low power communications engine or the always-on management or security solutions may be executed locally or remotely. The main memory 104 and the processor 102 also may include computer-readable media. Battery 114 may include a smart battery system that tracks and provides power state data 126. This power state data may be stored with the instructions, parameters, and profiles 124 to be used with the systems and methods disclosed herein.

A network interface device shown as wireless adapter 120 can also provide connectivity to a network 128 not only for low power communication technology as described, but also via other wireless protocols that may be deployed with the information handling system. For example, a wide area network (WAN), a local area network (LAN), wireless local area network (WLAN), a wireless personal area network (WPAN), a wireless wide area network (WWAN), or other network may be implemented with a wireless adapter such as 120. Connectivity may be via wired or wireless connection. Wireless adapter 120 may include one or more radio frequency subsystems 130 with transmitter/receiver circuitry, modem circuitry, one or more unified radio frequency front end circuits, one or more wireless controller circuits, amplifiers, antenna systems 132 and other radio frequency subsystem circuitry 130 for wireless communications via multiple radio access technologies. Each radiofrequency subsystem 130 may communicate with one or more wireless technology protocols. The radiofrequency subsystem 130 may contain individual subscriber identity module (SIM) profiles for each technology service provider and their available protocols for subscriber-based radio access technologies such as cellular LTE communications. The wireless adapter 120 may also include antenna systems 132 which may be tunable antenna systems for use with the system and methods disclosed herein.

In some aspects of the present disclosure, one wireless adapter 120 may operate two or more wireless links. In a further aspect, the wireless adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, a 5 GHz wireless communication frequency band may be apportioned under the 5G standards for communication on either small cell WWAN wireless link operation or Wi-Fi WLAN operation. In some embodiments, the shared, wireless communication band may be transmitted through one or a plurality of antennas. Other shared communication frequency bands are contemplated for use with the embodiments of the present disclosure as well.

The wireless adapter 120 may operate in accordance with any wireless data communication standards. To communicate in low power communication technology, standards including LPWAN. LoRa, Sigfox, Narrow Band IoT and LTE Category Machine (e.g., Cat M1) standards promulgated by 3GPP Narrowband cellular or later iterations may be utilized. For example, Narrow Band IoT may operate at 200 kHz and LTE Cat M1 band may operate in a range from 1.4 to 20 MHz. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with low power communication technology standards, the WLAN standards, and WWAN carriers which may operate in both license and unlicensed spectrums. For example, both WLAN and WWAN may use the Unlicensed National Information Infrastructure (U-NII) band which typically operates in the ~5

MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless radio frequency communication capabilities as well as licensed wireless radio frequency communication capabilities. For example, licensed wireless radio frequency communication capabilities may be available via a subscriber carrier wireless service. With the licensed wireless radio frequency communication capability, WWAN RF front end may operate on a licensed WWAN wireless radio with authorization for subscriber access to a wireless service provider on a carrier licensed frequency band.

The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. In an example embodiment, an information handling system may have an antenna system transmitter 132 for low power communication technologies such as LPWAN, 5G small cell WWAN, Wi-Fi WLAN or WiGig connectivity and one or more additional antenna system transmitters 132 for other wireless communication types. The radio frequency subsystems 130 include wireless controllers to manage authentication, connectivity, communications, power levels for transmission, buffering, error correction, baseband processing, and other functions of the wireless adapter 120.

The radio frequency subsystems 130 of the wireless adapters may also measure various metrics relating to wireless communication in the present disclosure. For example, the wireless controller of a radio frequency subsystem 130 may manage detecting and measuring received signal strength levels, bit error rates, signal to noise ratios, latencies, jitter, and other metrics relating to signal quality and strength. In one embodiment, a wireless controller of a wireless interface adapter 120 may manage one or more radio frequency subsystems 130. The wireless controller also manages transmission power levels which directly affect radio frequency subsystem power consumption as well as transmission power levels from the plurality of antenna systems 132. The transmission power levels from the antenna systems 132 may be relevant to specific absorption rate (SAR) safety limitations for transmitting mobile information handling systems. To control and measure power consumption via a radio frequency subsystem 130, the radio frequency subsystem 130 may control and measure current and voltage power that is directed to operate one or more antenna systems 132.

The wireless network may have a wireless mesh architecture in accordance with mesh networks described by the wireless data communications standards or similar standards in some embodiments but not necessarily in all embodiments. The wireless adapter 120 may also connect to the external network via an LPWAN, WPAN, WLAN, WWAN or similar wireless switched connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. Moreover, BIOS/FW code may manage and respond to wake up commands from various advanced configuration and power interface (ACPI) states via ACPI-aware BIOS and controls via ACPI tables, BIOS, and registers. In some embodiments, triggers for a wake event may trigger an embedded controller to wake the BIOS via a remote management card for example. Such ACPI operation may control global states, processor states, device states for various types of sleep states as well as performance states such as CPU or GPU throttling and the like. This may include Active State Power Management (A SPM) as well as other power management measures in the information handling system 100. In a particular embodiment, BIOS/FW code may reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs and BIOS/FW code such as code instructions 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as solid state memory, disks, tapes, or other storage device to store information received via carrier wave signals such as a signal communicated over a transmission medium. Furthermore, a computer readable medium can store information received from distributed network resources such as from a cloud-based environment. For example, a digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
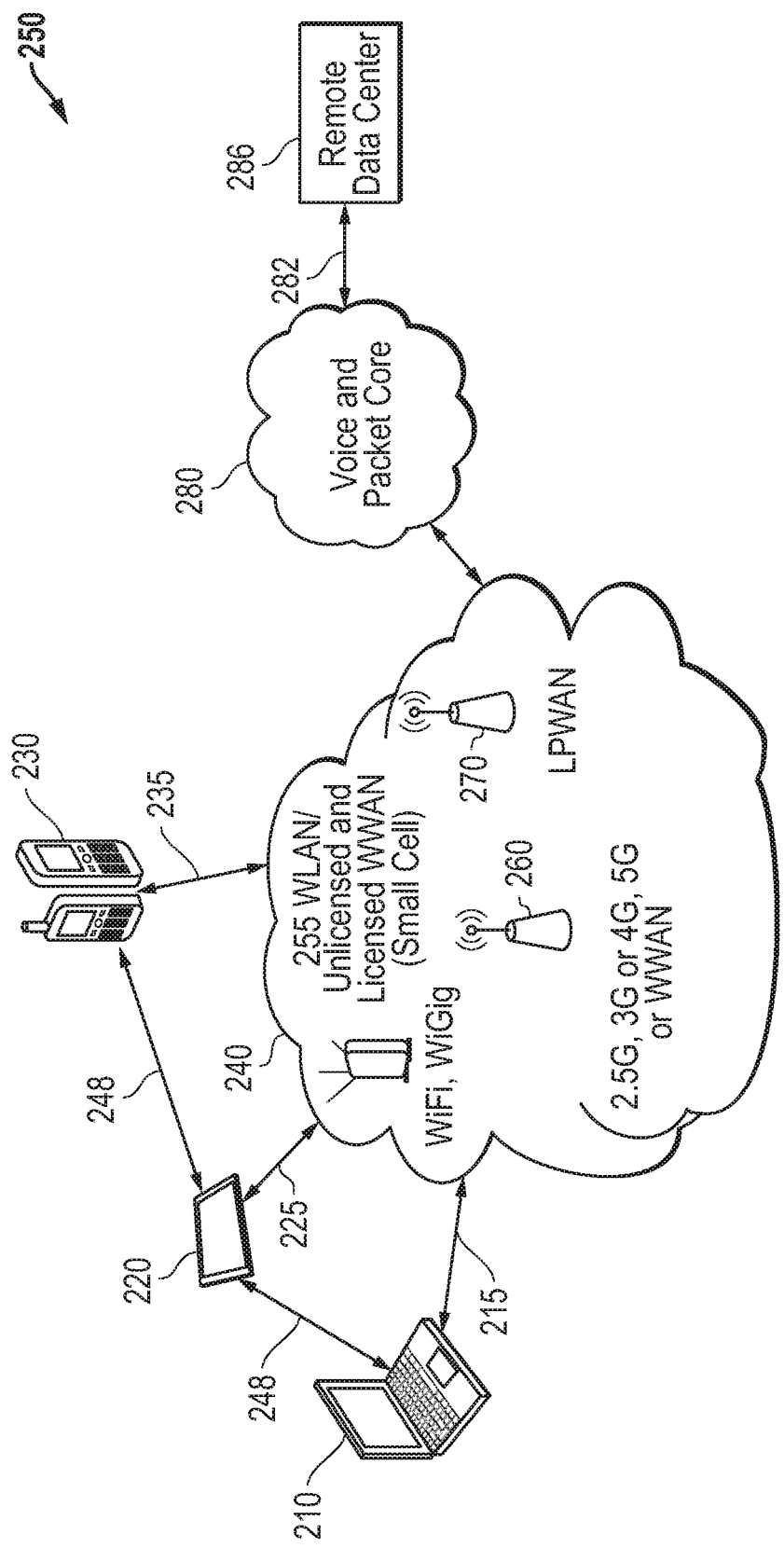
FIG. 2 is a block diagram of a network environment offering several communication protocol options and mobile information handling systems according to an embodiment of the present disclosure.

FIG. 2 illustrates a network 250 that can include one or more information handling systems. In a particular embodiment, network 250 includes networked information handling systems 210, 220, and 230 with wireless capabilities, wireless network access points such as 255, 260, 270, and multiple wireless connection link options. A variety of additional computing resources of network 250 may include client mobile information handling systems, data processing servers, network storage devices, local and wide area networks, or other resources as needed or desired. As specifically depicted, systems 210, 220, and 230 may be a laptop computer, tablet computer, 360 degree convertible systems, wearable computing devices, a smart phone device, server systems, or other computing systems. These mobile information handling systems 210, 220, and 230, may access any of a plurality of wireless networks 240. Wireless networks 240 may include low power communication technologies such as LPWAN 270, a macro-cellular network 260, or wireless local networks such as 255 including WiFi, WiGig, other WLAN, and small cell WWAN. For example, the wireless networks 240 may be the LPWAN network 270 or other low power communication technologies described in embodiments herein for low-power, always-on wireless communication in some embodiments. In other embodiments, wireless networks may include wireless local area networks (WLANs) or small cell systems 255, a wireless personal area network (WPAN) 248 as between devices such as 210, 220, and 230, or a wireless wide area network (WWAN) such as 260. In an example embodiment, LTE LPWAN networks may operate with a wireless access point option such as an eNodeB (eNB) base station or other LPWAN base station device. In another example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN, an LPWAN, or other low power communication technologies may be connected by wireline or Ethernet connections to a wider external network. For example, wireless network access points may be connected to a wireless network controller and an Ethernet switch.

Wireless communications across any of wireless networks 240 may be via standard protocols such as Narrow-band IoT LPWAN, LTE Category Machine LPWAN standards (such as Cat M1), LoRa, Sigfox, other low power communication technologies, IEEE 802.11 Wi-Fi, IEEE 802.11ad WiGig, IEEE 802.15 WPAN, or other emerging 5G small cell WWAN communications such as eNodeB, or similar wireless network protocols. Alternatively, other available wireless links within wireless networks 240 of network 250 may include macro-cellular connections via one or more service providers 260. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like. Wireless networks 240 may include a variety of licensed, unlicensed or shared communication frequency bands as well as a variety of wireless protocol technologies ranging from those operating in macrocells, small cells, picocells, or femtocells.

In some embodiments according to the present disclosure, a networked information handling system 210, 220, or 230 may have a plurality wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Example protocols for use with low power communication technologies may be low-power wireless network access protocols such as LTE Narrowband IoT, LTE Category Machine protocols, LoRa protocols, Sigfox protocols, or other LPWAN protocols enabling device to device communications along with connectivity to wider network resources via ethernet or other wired connections. With low power communication technology wireless links, information handling systems such as 210, 220, and 230 may remain connected for always-on communication to support always-on management or security solutions for IT managers to manage aspects of those information handling systems despite sleep state that may currently be implemented. The always-on communication may occur and may be received and executed upon, but depending on power state of the managed information handling systems according to embodiments herein. Such power state issues with managed information handling systems may be addressed or mitigated with remedies according to the low power communications engine of the low power communication technology, for example LPWAN, wireless interface adapter or remote management card according to embodiments herein.

Wireless networks 240 may be connected through to a voice and packet core network 280 may contain externally accessible computing resources and connect to a remote data center 286 in network 250. The voice and packet core network 280 may contain multiple intermediate web servers or other locations with accessible data (not shown). The voice and packet core network 280 may also connect to other wireless networks similar to those shown within 240 and additional mobile information handling systems such as 210, 220, 230 or similar connected to those additional wireless networks. Connection 282 between the wireless networks 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more information handling systems 210, 220, and 230. Alternatively, information handling systems 210, 220, and 230 may connect to the external network via base stations according to various wireless protocols 255, 260, or 270 within wireless networks 240. The remote data centers or other remote information handling systems may provide central terminals for IT management and security assessment via operation of always-on management or security solution code instructions via cloud agents of such systems in various embodiments.

Remote data centers may include web servers or resources within a cloud environment that operate via the voice and packet core 280 or other internet connectivity. For example, remote data centers can include additional information handling systems, data processing servers, network storage devices, local and wide area networks, or other resources as needed or desired. Having such remote capabilities may permit powerful resources to be maintained for low-power access during any sleep state or wake state of the information handling systems 210, 220, and 230 and allowing streamlining and efficiency of power consumption while providing effective management within those devices by the always-on management or security solutions. Similarly, a remote data center permits fewer resources to be maintained in other parts of network 250.

In an example embodiment, the cloud or remote data center or networked server may run hosted applications for systems 210, 220, and 230 such as the always-on management or security solution code instructions. For example, remote data center, networked server, or some combination of both may operate some or all of a Dell Command/Intel vPro®, Dell Mangement Engine®, or Airwatch® in various example embodiments including providing low-power, always-on communication access for messages and commands of varying levels of priority. For example, security alerts, setting adjustments, provisioning for managed information handling systems 100 or updates of the same as disclosed in the present disclosure may be transmitted via the low power communication technology (e.g., LPWAN) system even during sleep states.

The cloud or remote data center or networked server may run hosted applications for systems 210, 220, and 230 by establishing a virtual machine application executing software to manage applications hosted at the remote data center in an example embodiment. Information handling systems 210, 220, and 230 may adapted to run one or more applications locally, and to have hosted applications run in association with the local applications at remote data center or networked servers. For example, mobile information handling systems 210, 220, and 230 may operate some or all in-band software applications utilizing the wireless links, including a concurrent wireless links, of any of the wireless links 215, 225, 235 in some embodiments. Virtual machine applications may serve one or more applications to each of information handling system 210, 220, and 230. Thus, as illustrated, systems 210, 220, and 230 may be running applications locally while requesting data objects related to those applications from the remote data center via wireless network 240 when the information handling systems are awake and operating in various operating states. For example, an electronic mail client application may run locally at system 210. The electronic mail client application may be associated with a host application that represents an electronic mail server. In another example, a data storage client application such as Microsoft Sharepoint may run on system 220. It may be associated with a host application running at a remote data center that represents a Sharepoint data storage server. In a further example, a web browser application may be operating at system 230. The web browser application may request web data from a host application that represents a hosted website and associated applications running at a remote data center.

Figure 3:
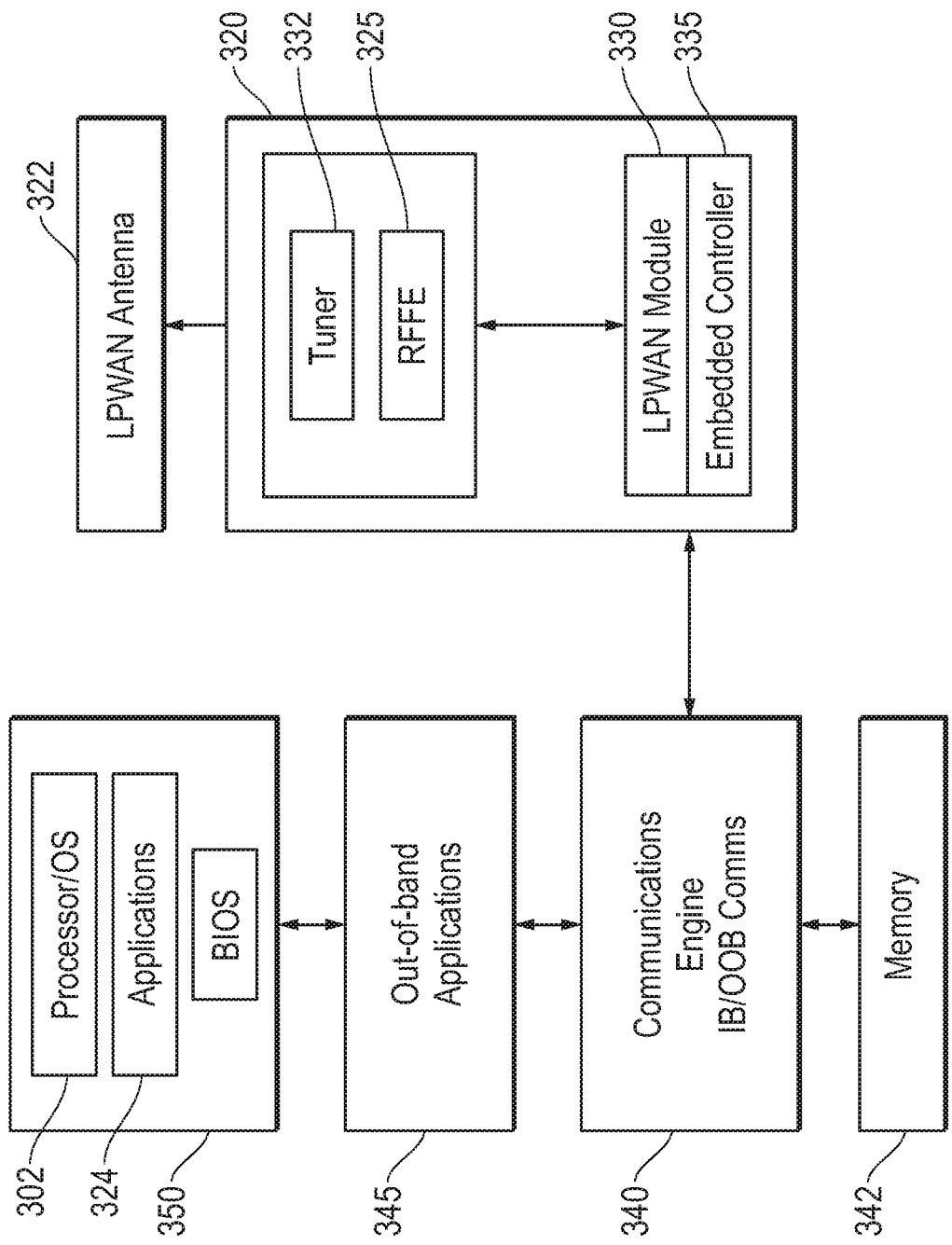
FIG. 3 block diagram illustrating an LPWAN wireless interface adapter with a low power (LP) communications engine for an information handling system according to an embodiment of the present disclosure.

FIG. 3 illustrates a wireless interface adapter 320 including RF front end 325 and tuner 332 for one or more antenna systems, such as a low power communication technology antenna 322, that may operate on an information handling system in an example embodiment. In an example aspect, the wireless interface adapter 320 may be utilized with an out-of-band operational environment in that it may be implementable in a variety of models of information handling systems to provide for always-on wireless connectivity in a variety of sleep states or performance states. The out-of-band operational environment may include an embedded processor, such as embedded controller 335, that may provide logic for firmware or software instructions that implement a low power communications engine 340 according to embodiments of the present disclosure. In other embodiments, the low power communications engine 340 may be implemented on processing or logic available from elsewhere in a managed information handling system, such as a remote management card in some embodiments. A processor or controller available in an out-of-band environment may operate even during sleep states or lowered performance states under the ACPI or other power saving protocols.

The low power communication technology, such as LPWAN, wireless interface adapter 320 may include the RF front end 325, tuners 332, an RF front end controller such as 335 and may include access to a local memory 342 in some embodiments. The embedded controller 335 may also interface with the one or more tuners 332 and execute the low power communication technology module 330 for conducting low power communication technology communications according to protocols being implemented for the low power communication technology communications. For example, low power communication technology protocols such as LPWAN, LoRa, Sigfox, LTE Narrowband IoT and LTE Category Machine protocol types and others may be implemented in some embodiments as understood in the art with the low power communication technology module 330. The RF front end module 325 may interface with one or more low power communication technology antenna systems 322 directly or via a tuner system 332.

Components of the low power communication technology wireless interface adapter such as LPWAN adapter 320 may be connected internally and to a plurality of system motherboard components for an information handling system. For example, I2C lines may be connected between the RF front end 325 and a low power communication technology module or among other components of the low power communication technology wireless interface adapter 320 or to the motherboard 350 or remote management card of an information handling system. The remote management card may operate code instructions communications engine 340 for in-band (IB) and out-of-band (OOB) communications as well as out-of-band applications 345 in various embodiments. The remote management card in some embodiments may further have access to a local memory such as 342 in some embodiments. In a further aspect, a Mobile Industry Processor Interface (MIPI) lines may be connected among components of the low power communication technology wireless interface adapter 320 or the motherboard 350 of the information handling system in other embodiments. The MIN connector or I2C may be connected to the low power communication technology module 330 to forward instructions, policy details, or other data or commands to the RF front end 325 according to embodiments of the present disclosure. It is understood that the I2C lines or MIPI lines may be used for various aspects of the embodiments disclosed herein including for transfer of data, policy, or commands from the protocol module 330 or other subsystems of the wireless interface device adapter 320. Further, other bus systems as shown in FIG. 1 may be used for communications between the low power communication technology interface adapter 320 and portions of the motherboard of the managed information handling system.

Low power communications engine 340 of the present disclosure may include hardware, firmware, or software instructions to determine priority levels received via incoming messages, instructions, and data from low power wireless links according to one or more low power communication technology protocols. The low power communications engine 340 further determines priority levels for in-band messages bound for in-band applications 324 operating via processors such as 302 or out-of-band applications 345 bound for out-of-band applications operating on an information handling system network management card in embodiments. With either type of incoming low power communication technology data traffic, the low power communications engine 340 may determine low power communication technology data traffic limitations to be applied to the incoming low power communication technology data traffic which may include forwarding, storing, or discarding the low power communication technology data traffic in various embodiments of the present disclosure. In some embodiments, the low-power communications engine operates in an out-of-band environment in whole or in part on a processor or controller other than the CPU 302. In an example embodiment, the out-of-band environment may operate on embedded controller 335 or on other processors or controllers such as for a remote management card. In further embodiments, out-of-band environment may reside in some portion of processing on the motherboard 350, such as with an integrated remote management card. The low power communications engine 340 may interface with the BIOS operating with the operating system of the main processor or processors in various embodiments when wake up is needed. An event may cause the low power communications engine to send a trigger to an embedded controller on a network management card or elsewhere to wake the BIOS in some example embodiments. Additionally, the low power communication technology interface adapter 320 may operate during powered-down sleep states such that an embedded controller 335 may serve as a network interface controller in some aspects and implement Remote Management Control Protocol (RMCP) or similar remote via a separate MAC address from other wireless communications to provide communications, data, instructions or the like received via a remote management card which may be separate or integrated into motherboard 350.

In some embodiments, the remote management card may include a processor or controller (not shown) to execute code instructions in software or firmware in the out-of-band environment. Often the out-of-band environment may include remote management and security applications 345 that may influence operations such as remote reboot, provisioning and others as described above. This out-of-band environment may be provided with always-on management or security solutions such as Dell Command/Intel vPro Out-of-band or Dell Management Engine for example. Nonetheless, processing capability of the remote management card, whether integrated or not, may provide for execution of instructions of the low power communications engine 340 in assessing both out-of-band communications and in-band communications. This may be done in some embodiments via the processor or controller on the remote management card or in combination with a processor or controller in the wireless interface adapter 320. In some embodiments, the remote management card may include memory 342 which may be used to execute out-of-band applications 345 as well as activity of the low power communications engine 340 such as to store communications or data in some embodiments.

As described in greater detail in embodiments herein, always-on management or security solutions, such as Dell Command/Intel vPro Out-of-band, Dell Management Engine, or AirWatch In-band Applications may operate to send messages, commands, data or the like via low-power communications on an low power communication technology wireless link to a managed information handling system. The low power communication technology wireless interface adapter 320 may receive the low-power communications via the low power communication technology protocol utilized and transfer those communications to the low-power communications engine 340 for assessment of header priority designations according to embodiments herein. Depending on received header priority designations, the low-power communications engine 340 may forward the communication messages, commands, data or the like to the out-of-band applications 345 or the in-band applications 324. Priority level thresholds in determining which message priority levels to forward may be dynamic in some embodiments depending on power state of the information handling system. Forwarding the received low-power communications by the low-power communications engine may require communication with an embedded controller to wake up the BIOS of an information handling system from a sleep state in some cases. To do so consumes power but wake up may not be necessary for all low power communication technology delivered messages or data. Thus, a low-power communication priority threshold level may be dynamically altered with the power state for determination under what circumstances received messages in data packets via WLAN should trigger wake up of the BIOS of the managed information handling system in embodiments herein.

Figure 4:
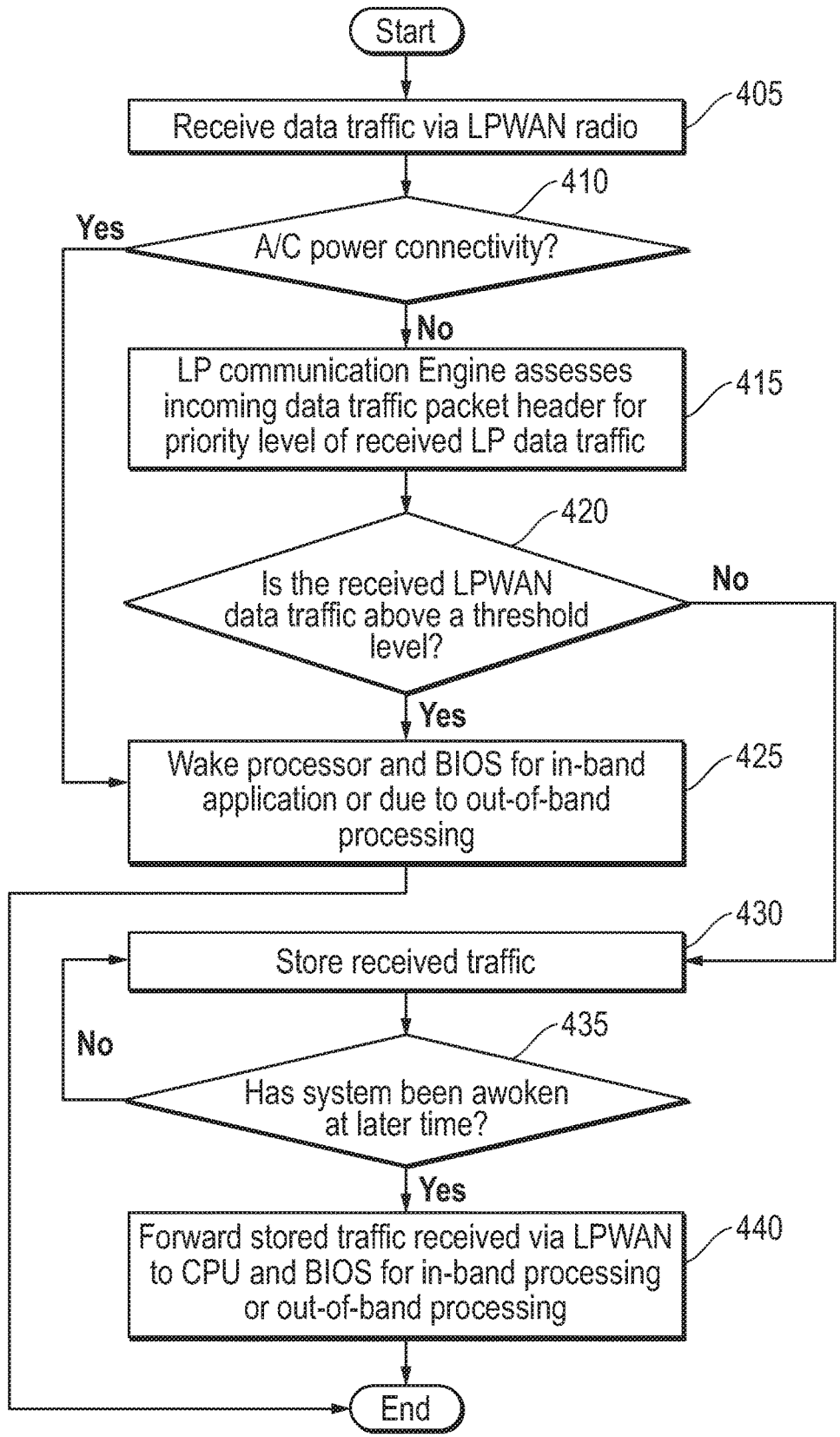
FIG. 4 is a flow diagram illustrating a method of operating a low power (LP) communications engine according to an embodiment of the present disclosure.

FIG. 4 illustrates a method for determining incoming packet data priority levels via a low-power communications engine (LP communications engine) according to an embodiment. The determination of incoming low power communication technology data traffic priority levels as compared to one or more priority threshold levels implemented at designated battery levels may determine low power communication technology data traffic limitations applied by the low power communications engine of embodiments of the present disclosure. In this example embodiment, one or more low power communication technology wireless links may be always-on and available for a mobile information handling system to receive wireless transmissions of data packets from an always-on management or security solution, such as Dell Command/Intel vPro Out-of-band, Dell Management Engine, or AirWatch solutions as described above. In a further embodiment, LP communications engine may be used with reported power state data 126 from a smart battery system tracking battery levels or whether A/C power is connected for information handling systems.

The method of FIG. 4 may be executed via code instructions for an LP communications engine on one or more processors or controllers such as in the wireless interface adapter or a remote management card in an information handling system. As described, a remote management card may be integrated or separate in the information handling system in some embodiments. The remote management card may include logic for a processor and/or controller as well as memory that may operate despite a sleep state, such an ACPI sleep state, being implemented on the information handling system. It is understood that each of the following steps may be performed by the LP communications engine at the information handling system entirely at one controller or processor or across several processors or controllers in the out-of-band environment and at the wireless interface adapter. The always-on management or security solutions, such as Dell Command/Intel vPro Out-of-band, Dell Management Engine, or AirWatch solutions, may also have some portion performed from a remote location in whole or in part while other portions of the remote management may take place at the managed information handling system.

At 405, the information handling system with an always-on low power communication technology wireless link may receive data packets via the low power communication technology wireless interface adapter. The low power communication technology module may receive the data packets and provide those packets to the LP communications engine located in an embedded controller or processor at the low power communication technology wireless interface adapter or located at a remote management card at the information handling system. The LP communications engine are code instructions executed in firmware or software at a controller or processor at the remote management card, low power communication technology wireless adapter, or some combination. The LP communications engine will receive data packets transmitted via low power communication technology.

At 410, the LP communications engine will retrieve power state data from a battery or power module of the information handling system. This power state data may have been retrieved before a managed information handling system entered a sleep state or may be retrieved upon receipt of low power communication technology communications data packets in various embodiments. The power state data may include an indication of whether the information handling system is connected to a power source such as an A/C transformer power source. In an embodiment, if the information handling system is indicated as connected to an A/C power source, flow would proceed to 425 to wake the BIOS of the information handling system via an embedded controller signaling the BIOS for processing of the data packets via an in-band or out-of-band application. With A/C power source connection detected, power saving measures to prevent a wake-up of the managed information handling system may not be as critical in some embodiments. In other embodiments not shown, the power management via the LP communications engine may be implemented even with an A/C power source connection. One of skill will understand that a variation not implementing the step at 410 may be implemented in some embodiments when LP communications engine assessment of message priority is still desired during A/C power connection.

At 425, the LP communications engine may trigger an embedded controller forward a wake command to the BIOS along with received low power communication technology data packets to wake the managed information handling system for in-band processing in one aspect. In another embodiment, the LP communications engine may instead cause the received low power communication technology data packets to be forwarded to out-of-band applications that may require the managed information handling system to be awoken from a sleep state to implement controls or other requirements resulting from the received low power communication technology data packets for the out-of-band application. As example embodiments, the always-on management or security solutions, such as Dell Command/Intel vPro Out-of-band, Dell Management Engine, or AirWatch solutions may provide provisioning instructions, updates, security alerts and commands for remote management of peripheral systems, or other remote commands such as security alerts and measures required in example embodiments. For example, the Dell Command/Intel vPro Out-of-band or Dell Management Engine always-on management or security solution will provide for out-of-band controls, data, instructions, or the like to a remote management card for implementation of such controls, data, or instructions thereon.

Depending on the type of instruction, command, or data provided via the low power communication technology data packets received, the out-of-band remote management card embedded controller may send a wake command to the BIOS and operating system of the managed information handling system to implement changes or adjustments required by the received data packets. In another embodiment, the always-on management or security solution may be an in-band application such as AirWatch. The received low power communication technology data packets must be elevated to the operating system of the information handling system and a wake command trigger must be sent to an embedded controller to wake the BIOS, thus the system will wake the managed information handling system.

If no A/C power source connection is indicated from the power state data at 410, then the flow may proceed to 415 in an embodiment. In an alternate embodiment, as described, proceeding to block 415 may not require detection of an A/C power connection. At 415, the LP communications engine will assess the incoming data packets for priority level indicators assigned to the received low power communication technology data traffic. The always-on management or security solutions, either out-of-band or in-band, for remote management of the information handling system provide a priority designation to the packet or packets of data transmitted to the managed information handling system via the low power communication technology. The always-on management or security solutions provide a priority designation to the packet or packets of data transmitted from the cloud agent of the remote management or security solution. In an example embodiment, there may be four priority levels assigned, but it is understood that data packet priority may be provided with any number of priority levels to provide additional control over when or how received low power communication technology data packets may initiate a wake command from an embedded controller to BIOS via out-of-band applications or in-band applications or initiate storage of lower priority low power communication technology packets. Further, the priority values may utilize several priority designation methods including a lowest header value (e.g., 0) assigned to the highest priority or the opposite where the highest header value appearing in a priority designation has the highest priority value. Table 1 (below) shows an example embodiment of priority designations that may be received in one example embodiment. Table 1 further shows an example of how dynamic priority threshold levels may change depending on power status detected from the smart battery system in the battery module or power module.

TABLE 1

LP Communication Engine Control Parameters

| Priority level | Example type of data packet | Designated Threshold Battery Level |
|---|---|---|
| 0 | Critical | N/A |
| 1 | High Importance | <5% battery life |
| 2 | Important | 5-10% battery life |
| 3 | Status | 10-30% battery life |

While Table 1 is illustrative of low power communication technology data traffic limitation policy parameters that may be used by an LP communication engine to execute the embodiments herein. The low power communication technology data traffic limitation policy illustrated is understood to be an example set of policy parameters that may have additional aspects or may be different depending on several factors. Further, the low power communication technology data traffic limitation policy may be customized. For example, different low power communication technology packet data wake policy arrangements may be set for various models of information handling systems, for different always-on management or security solutions, or the policy may be customized by IT managers or users of managed information handling system in various embodiments. Moreover, priority levels may be more or fewer and designation of types of information received in low power communication technology data packets may vary for each priority level description. The labels for each priority level shown above are for explanatory purposes and may vary widely among remote management systems or at the discretion of IT managers implementing such systems. Additionally, the designated threshold battery levels may also be altered from those battery levels shown above. The battery life levels indicated as threshold levels are for explanatory purposes and are only one possible example embodiment. Any threshold battery levels may be used, and those battery levels may be altered depending on usage or function of managed information handling systems including importance of tasks assigned to the managed information handling system, likelihood of near-future access to A/C power, and other factors. Thus, it is understood that Table 1 above shows only an example LP communications engine data packet priority policy which may further be only part of a matrix of tables or data determining one or more threshold priority levels of the overall remote management for the information handling system.

Examples of critical priority level data packets may be those associated with critical alerts or messages such as with a security compromise detected or determination that an attack is currently ongoing to an enterprise needing critical security response measures. Other example critical priority data packets are contemplated as well. Examples of high importance priority level data packets may be those associated with less critical alerts or messages such as a pending nearby detected security threat but not one that is pending. Again, the nature of high importance priority level data packets contemplates a variety of additional types of data packets that may be designated high importance priority level.

Example of important priority level data packets may be those associated with yet a lower level of alert or message such as those associated with notifications of issues resolved with systems of the information handling system or potential security threat levels or the like. Other data packets of a variety of types may be designated important priority level in various embodiments.

Examples of status priority level data packets may be those associated with status check requests for system of the managed information handling system or updates being pushed to the managed information handling system. For example, OS updates or driver updates for system within the managed information handling system may be categorized under status priority level data packets in example embodiments. Other example status priority level data packets are contemplated in various embodiments.

Returning to 415, the LP communications engine will determine the battery power state of the managed information handling system received from the smart battery system indicating the battery power level of the managed information handling system. With the determined battery power state data, the LP communications engine will determine which priority level to use as a threshold in determining to forward or not to forward received low power communication technology data packets such as low power communication technology data packets. To forward the received low power communication technology data packets may result in the managed information handling system waking the managed information handling system from a sleep state immediately in some embodiments. The threshold priority level may act as the lowest level of data forwarded that will cause the managed information handling system to wake in some example embodiments. In other example embodiments, the threshold priority designation level may act as the highest priority level to be denied forwarding by the LP communications engine and to elicit a wake request from an embedded controller to the BIOS based upon this trigger. In the currently describe embodiment of FIG. 4, the latter threshold designation action, highest level to be denied forwarding, is shown. One of skill will understand however that either may be implemented with the present embodiment.

In response to the determination of the packet header priority designation and determination of the threshold priority designation level, the LP communication engine will determine whether the received low power communication technology data packet priority designation is above the threshold priority designation level at 420. As described, LP communications engine data priority assessment policy may include dynamic control tables, such as the example shown in Table 1, for priority level threshold designations based on battery power states. As explained, several variations of Table 1 may be utilized as described herein.

If the received low power communication technology data packets are determined to have a priority level designation in the header at a level above the threshold level determined based on the battery power state, then the flow may proceed to 425. As described above, at 425 the LP communications engine may forward to an embedded controller a trigger for a wake command to the BIOS to wake the managed information handling system or cause the received low power communication technology data packets to be forwarded to an in-band application in an embodiment. In other embodiments, the priority level of received low power communication technology data packets above the threshold priority level will cause received data packets forwarded to out-of-band applications such that the out-of-band applications may require the managed information handling system to be awoken from a sleep state to implement controls or other requirements resulting from the received data packets.

In an example embodiment such as with Table 1, the always-on management or security solution may send a critical priority data packet (level 0) indicating that a compromise is detected requiring immediate measures and while the managed information handling system is not connected to an A/C power source. If the battery power state is at less than 5% in the example embodiment and the threshold level is at high importance (level 1) in Table 1, the received low power communication technology data packets are at critical priority level (level 0) which is determined to be at a higher priority level above the threshold level (level 1) according to an embodiment. Pursuant to this determination, the LP communications engine forward the received low power communication technology data packets and may cause the embedded controller to wake the BIOS the processor and other systems of the managed information handling system. Waking the managed information handling system may occur despite the low level of battery power remaining. In the example embodiment described, forwarding the low power communication technology data packets may allow for implementation of critical defensive measures against the security compromise. Several examples of critical security measures may take place including locking down other wireless network adapters or to limiting access to application programs or files to prevent outside attack intrusion to thwart the security attack in the example embodiment described.

Upon forwarding the received low power communication technology data packets at 425 and triggering an embedded controller to wake the BIOS, the process may end although the low power communication technology communications engine will continue to monitor sleep state indicators, power state indications, and low power communication technology communications as described in embodiments herein.

If the received low power communication technology data packets are determined to have a priority level designation in the header at or below the threshold priority level determined based on the battery power state, then the flow may proceed to 430. At 430, the LP communications engine may determine to store the received packets with priority designation headers at or below the threshold priority level in a local memory. The memory may be part of the low power communication technology wireless interface adapter, at the remote management card, or may be located with another part of the information handling system in some embodiments. In an example embodiment, the memory may be part of a remote management card integrated in the motherboard or part of a standalone remote management card. In one embodiment, the memory may be an addressable memory from which stored messages may be retrieved and forwarded to remote management and security applications upon the managed information handling system BIOS being awakened due to another cause such that the low power communication technology packets stored during a sleep state may be delivered. In other embodiments, the memory may be a buffer memory with a first-in, first out structure such that older messages are transferred first from memory. In yet another example embodiment, a last-in, first out structure buffer memory may be used such that newer messages are transferred first from memory which, for example, may be beneficial when newer updates or status messages would be preferable to older versions.

In some embodiments that are not shown in FIG. 4, received low power communication technology data packets not above a threshold priority level may be discarded instead of stored. Since lower priority level low power communication technology packets are likely to be resent at a later time, such as when no response is received, discarding the packets not meeting a priority level will result in minimal consequence in some embodiments. In yet other embodiments, two priority thresholds may be implemented such that above a first priority threshold level leads to waking the managed information handling system, data packets at or below the first priority level but above a second priority level are stored in memory. Those packets at or below a second priority level may be discarded. Thus, received low power communication technology packets that have indications in the packet header at a lowest priority level, such as for status requests or updates which are likely to be resent at a later time for example, may likely be discarded at a low-power battery state. Middle priority level packets however, such as high importance or important priority level packets, that may above a second priority level threshold may be stored in memory in an example embodiment. In some embodiments, both priority threshold levels may be dynamic in that they may both change according to reported power state levels.

At 435, the LP communications engine will receive an indication that the managed information handling system has been awoken from a sleep state by another trigger. For example, a later critical priority low power communication technology data packet may have been received or the managed information handling system may have been awoken by a user or plugged into an A/C power source. If no indication that the managed information handling system has been awoken is received at 435, the flow returns to 430 to continue storing the received low power communication technology data packets not exceeding the priority threshold level and the LP communications engine will continue monitoring for the managed information handling system for events to trigger an embedded controller to wake up BIOS from a sleep state.

If the managed information handling system has been awoken by user, by connection to A/C power, or for some other reason, flow may proceed to 440. At 440, upon the LP communications engine receiving indication that the managed information handling system has awoken, the LP communications engine will cause the stored low power communication technology data packets to be forwarded to a remote management or security solution operating on the information handling system, whether in-band or out-of-band in various embodiments. Utilization of any necessary in-band or out-of-band processing to respond to the command, message, data, or other information may then be implemented. At this point the process may end although the low power communication technology communications engine will continue to monitor sleep state indicators, power state indications, and low power communication technology communications such as LPWAN communications for determination of passing in-band or out-of-band communications received via the low power communication technology wireless interface adapter. In this way, improved power conservation and power management may be realized while supporting always-on remote management or security solution communications via low power communication technology wireless links.

It is understood that the methods and concepts described in the algorithm above for FIG. 4 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments.

Figure 5:
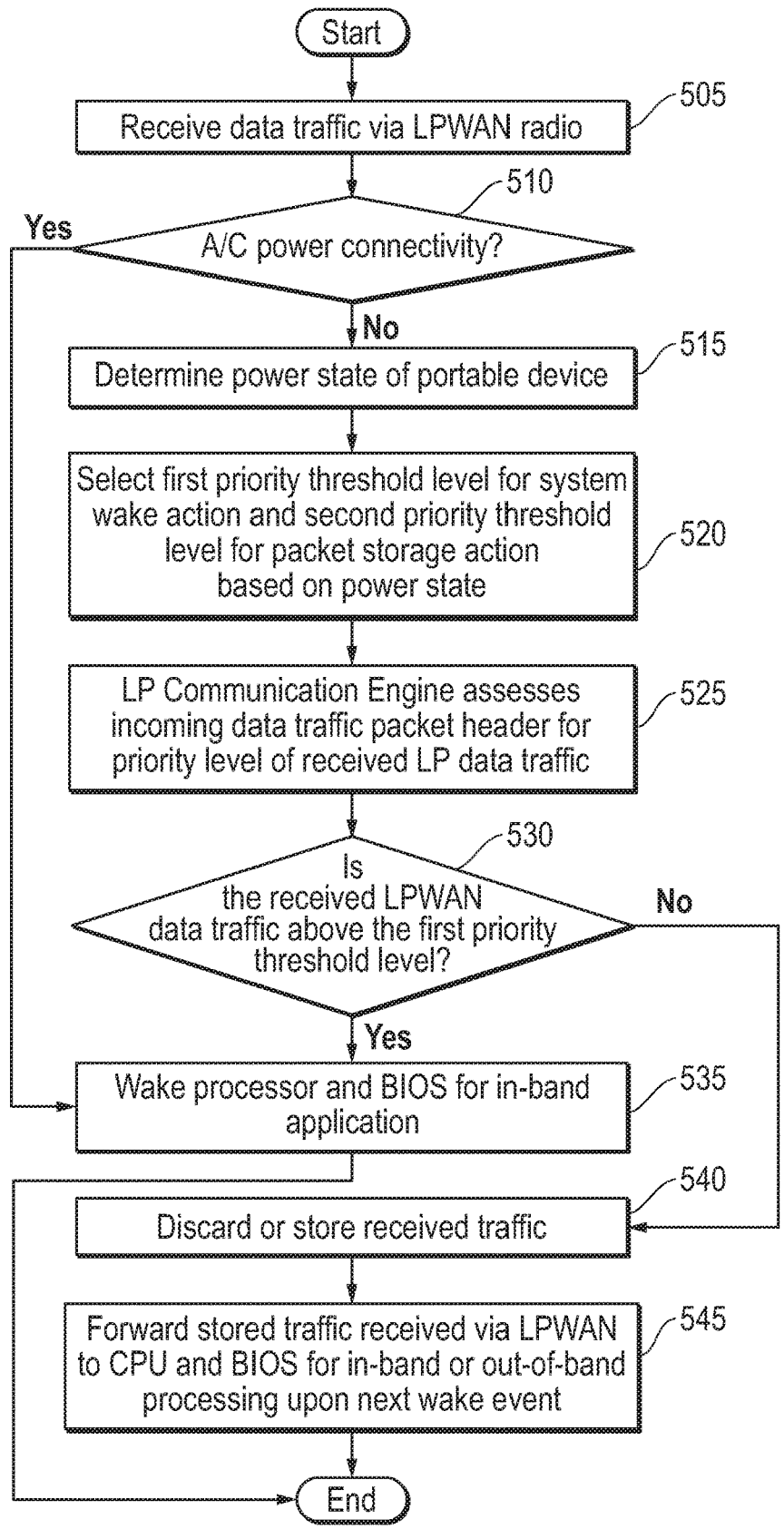
FIG. 5 is a flow diagram illustrating a method of operating a low power (LP) communications engine according to another embodiment of the present disclosure.

FIG. 5 illustrates another method for determining incoming packet data priority levels via a low-power communications engine (LP communications engine) according to an embodiment. The determination of incoming low power communication technology data traffic priority levels such as for various LPWAN protocols or similar low power communication protocols as compared to first and second priority threshold levels may determine low power communication technology data traffic limitations and actions that may be implemented by the low power communications engine in example embodiments. In this example embodiment, one or more low power communication technology such as LPWAN wireless links may be always-on and available for a managed information handling system to receive wireless transmissions of data packets. low power communication technology data packets may be received from an always-on management or security solutions, such as Dell Command/Intel vPro Out-of-band, Dell Management Engine, or AirWatch solutions, even when a managed information handling system is in a sleep state for power saving purposes such as under ACPI protocols as described above. The LP communications engine may be used with reported power state data from a smart battery system tracking battery levels and with indications of whether A/C power is connected for several models of managed information handling systems.

In various embodiments, the method of FIG. 5 may be executed via code instructions for an LP communications engine on one or more processors or controllers. The processor or control logic may reside in the wireless interface adapter or a remote management card for a managed information handling system. As described, a remote management card may be integrated or separate in the information handling system in some embodiments. The remote management card or low power communication technology wireless interface adapter, such as an LPWAN wireless interface adapter, may include logic for a processor and/or controllers and memory that operates despite implementation of a sleep state on the managed information handling system. It is understood that each of the following steps may be performed by the LP communications engine at the information handling system entirely at one controller or processor or across several processors and controllers. In some aspects, the LP communications engine may operate in an out-of-band environment at the wireless interface adapter, at the remote management card, or some combination while the managed information handling system is in an ACPI sleep state in some embodiments.

The process may start at 505 where the managed information handling system may receive data packets via the low power communication technology wireless interface adapter. The low power communication technology module may receive the data packets according to one or more low power communication technology protocols and provide those packets to the LP communications engine. As described, the LP communications engine may be located at the low power communication technology wireless interface adapter, at a remote management card, or be executed across a plurality of controllers or processors of the managed information handling system.

Proceeding to 510, the LP communications engine will retrieve power state data from a battery module or power module of the information handling system. This power state data may have been retrieved before a managed information handling system entered a sleep state in one embodiment. In another embodiment, the power state information may be retrieved upon receipt of low power communication technology communications data packets in various embodiments. The power state data may include an indication of whether the information handling system is connected to a power source or battery power levels indicating a battery percentage remaining. At 510, if the power state information indicates connection to an A/C power source, flow may proceed to 535 to wake the BIOS of the information handling system from a sleep via signaling from an embedded controller. Then the LP communications engine may forward the low power communication technology data packets for processing via an in-band application in one embodiment when the remote management or security solution operates as an in-band application on the managed information handling system. In other embodiments, the LP communications engine may forward for out-of-band processing at the remote management card the low power communication technology data packets which may cause a wake trigger for utilization of the CPU and memory of the managed information handling system to process the management or security information received. In such a scenario, the out-of-band management or security application may trigger an embedded controller request to wake the BIOS of the managed information handling system from a sleep state as well.

In one example embodiment, the always-on management or security solutions, such as Dell Command/Intel vPro Out-of-band, Dell Management Engine, or AirWatch solutions may provide provisioning instructions, updates, security alerts and commands, remote management of peripheral systems, or other remote commands, messaging, or requests in example embodiments. For example, the Dell Command/Intel vPro Out-of-band or Dell Management Engine always-on management or security solution will provide for out-of-band controls, data, instructions, or the like to a remote management card for implementation of such controls, data, or instructions thereon. Depending on the type of instruction, command, or data provided via the low power communication technology data packets received, the out-of-band remote management card may send a wake command to the BIOS and operating system of the managed information handling system to implement changes or adjustments required by the received data packets. In other embodiments, the always-on management or security solution may be an in-band application such as AirWatch. The received low power communication technology data packets must be elevated to the operating system of the information handling system and an embedded controller may wake the BIOS and the data packets may be sent to the managed information handling system when an LP communications engine forwards received low power communication technology data packets.

If no A/C power source connection is indicated from the power state data at 510, then the flow may proceed to 515. At 515, the LP communications engine may assess the battery power level from the power state data. Similar to previous embodiments, the power state data will include battery power level percentages which will be used by the LP communications engine to select one or more priority threshold levels according to embodiments herein. Selection of priority threshold levels may occur depending on the battery level remaining in a managed information handling system. An example embodiment of priority threshold levels according to battery power state levels are shown in Table 2.

In the example embodiment, there may be four priority levels assigned to incoming low power communication technology data packets by remote management and security solutions communicating with a managed information handling system. It will be understood that data packet priority may be provided with any number of security levels to provide additional control over when or how received low power communication technology data packets may initiate a trigger for an embedded controller to wake the BIOS for out-of-band applications or in-band applications or when received data packets of lower priority may be discarded versus stored in memory. Further, the priority values may span any range from a lowest header value assigned to the highest priority to the opposite where the highest header value for a priority designation has the highest priority value. Table 2 (below) shows an example embodiment of priority designations that may be received in one example embodiment. Table 2 further shows an example of how both first and second priority threshold levels may be dynamic and change depending on power status detected from the smart battery system in the battery module or power module.

TABLE 2

LP Communication Engine Control Parameters

| Priority level | Example type of data packet | Designated First Threshold Battery Level | Designated Second Threshold Battery Level |
|---|---|---|---|
| 0 | Critical | N/A | N/A |
| 1 | High Importance | <5% battery life | N/A |
| 2 | Important | 5-10% battery life | <5% battery life |
| 3 | Status | 10-30% battery life | 5-20% battery life |

Similar to Table 1 shown above for FIG. 3, Table 2 is illustrative of low power communication technology data traffic limitation policy parameters that may be used by an LP communication engine to execute the embodiments herein. However, the low power communication technology data traffic limitations policy shown in Table 2 is understood to be an example set of priority threshold settings that may be subject to additional aspects and may be different for various models of information handling systems, for different always-on management or security solutions, or which may be customized by IT managers or users of managed information handling system in various embodiments. Moreover, priority levels may be more or fewer and designation of types of information received in low power communication technology data packets for designation at a type of priority level may vary widely among remote management systems or at the discretion of IT managers implementing such systems. Additionally, the designated battery levels corresponding to first or second priority thresholds may be varied in other embodiments as will be understood by those of skill. The battery life levels indicated in Table 2 are for explanatory purposes and are only one possible example embodiment. Any threshold battery levels may be used, and those battery levels may be altered depending on usage or function of managed information handling systems including importance of tasks assigned, likelihood of near-future access to A/C power, and other factors. Thus, it is understood that Table 2 above shows only one example LP communications engine data packet priority policy which may further only be part of a matrix of tables applied by the overall remote management for the information handling system for determining priority threshold levels in low power communication technology message power management.

Examples of critical priority level data packets, high importance level data packets, important priority data level packets, and status priority level data packets are described in more detail above for FIG. 4. It is understood that while four priority levels and descriptive priority level designations are used in the embodiments herein, not only any number of priority levels may be used, but also any descriptive designations may identify the priority levels in the embodiments of either FIG. 4, FIG. 5, or other example embodiment variations described herein.

At 520, the LP communications engine will determine the battery power state of the managed information handling system received from the smart battery system indicating the battery power level of the managed information handling system. With the determined battery power state data, the LP communications engine will determine which priority level to use as a threshold in determining to forward received low power communication technology data packets or not such that the managed information handling system may need to be awoken from a sleep state immediately. Further in some embodiments, the LP communications engine will also determine a second priority threshold level above which the LP communications engine may select to store the received low power communication technology packets not to be forwarded immediately, or at or below which the received low power communication technology packets may be discarded.

In some embodiments, the first and second threshold priority levels may act as the lowest level of data priority for which the actions, forwarding immediately or storing versus discarding, may be determined in some example embodiments. In other example embodiments, the first and second threshold priority designation levels may act as the highest priority level to be denied forwarding or denied storing of the received low power communication technology data packets by the LP communications engine. For example, received low power communication technology data packets with a priority level designation having higher priority than the first priority level threshold may be forwarded and may elicit a wake request to the BIOS according to some embodiments such as shown in FIG. 5. In another example embodiment, received low power communication technology data packets with a priority level designation having higher priority than the second priority level threshold, but at or below the first priority level threshold may be stored in memory for future forwarding. The stored low power communication technology data packets may be forwarded when the managed information handling system is awakened from a sleep state for a different purpose, such as by a user activating the managed information handling system. In yet another example embodiment, received low power communication technology data packets with a priority level designation having priority at or below the second priority level threshold may be discarded to avoid filling memory with low priority messages or data. In the currently described embodiment of FIG. 5, the threshold designation indicates the data packet priority levels above which action occurs for a higher priority designated data packets than the determined threshold priority level. One of skill will understand that application of the threshold priority level as the lowest level to determine a forwarding or storing action by the LP communications engine may be implemented in the present embodiments as well.

Proceeding to 525, the LP communications engine will assess the incoming data packets for priority level indicators of the received low power communication technology data traffic. The always-on management or security solutions, either out-of-band or in-band, for remote management of the information handling system provide a priority designation to the packet or packets of data transmitted to the managed information handling system. This priority designation may be provided in packet header metadata in an example embodiment. The packet or packets with priority designation levels are transmitted via low power communication technology from the cloud agent of the remote management or security solution. The LP communications engine may receive the low power communication technology packets from the LWPAN module and determine the priority designation for the packets from the packet headers.

In response to the determination of the packet header priority designation at 525 and determination of the threshold priority designation level at 520, the LP communication engine will determine whether the received low power communication technology data packet priority designation is above the first threshold priority designation level at 530. As described, LP communications engine data priority assessment policy may include dynamic control tables for the first priority level threshold designations based on battery power states such as with the example shown above in Table 2 or variations of the same as described in embodiments herein.

If the received low power communication technology data packets are determined to have a priority level designation in the header above the first threshold priority level determined based on the battery power state, then the flow may proceed to 535. At 535, the LP communications engine or other out-of-band application may forward a trigger to an embedded controller to wake the BIOS of the managed information handling system and cause the received low power communication technology data packets to be forwarded to in-band or out-of-band management or security applications as described herein. For example, the always-on management or security solution may send a high importance (level 1) priority data packet requiring a response while the managed information handling system is not connected to an A/C power source. It the battery power state is determined at 6% in the example embodiment of Table 2. In this example embodiment and according to TABLE 2, the threshold level is at important (level 2), and the received low power communication technology data packets at high importance (level 1) are at a higher priority level than the first threshold priority level. Pursuant to this determination, the LP communications engine may issue a request via an embedded controller or other controller or processor to wake the BIOS, the processor and other systems of the managed information handling system despite the low level of battery power remaining to forward the received LWPAN packets having a high importance (level 1) priority level in one embodiment for in-band applications. In some embodiments, received out-of-band application bound low power communication technology data packets at high importance (level 1) may be forwarded to the out-of-band application which may then request the embedded controller or other controller/processor to the wake BIOS and the processor and other systems accordingly. The remote management and security solution applications operating either in-band or out-of-band on the managed information handling system may respond to the high importance data packets received when the response require a managed information handling system to be awakened form a sleep state.

Upon forwarding the received low power communication technology data packets at 535, the process may end although the low power communication technology communications engine will continue to monitor sleep state indicators, power state indications, and low power communication technology communications as described in embodiments herein.

If the received low power communication technology data packets are determined to have a priority level designation in the header at a level at or below the threshold level determined based on the battery power state, then the flow may proceed to 540. At 540, the LP communications engine may determine whether to store or discard the received low power communication technology packets depending on whether or not the designated priority levels for those packets have a higher priority than the second threshold priority level. If the received LWPAN data packets have a priority designation in the packet header that is above the second threshold priority level, the received low power communication technology packets may be stored in memory. The memory may be part of the low power communication technology wireless interface adapter or may be located in another part of the information handling system such as a remote management card in various embodiments. If the received low power communication technology data packets have a priority designation level at or below the second threshold priority level, the LP communications engine may discard the received low power communication technology data packets.

In an example embodiment, the always-on management or security solution may send a important priority level data packet (level 2) while the managed information handling system is not connected to an A/C power source and battery power state is at 6%. In this example embodiment and according to Table 2, the first priority threshold level is at important (level 2) while the second priority threshold level is at level 3 or the status level. Since the received low power communication technology data packets are at level 2 which is not at a higher priority level above the first priority threshold level it will not be forwarded immediately. However, the received priority level 2 low power communication technology data packets are at a higher priority than the second priority threshold level. Pursuant to this determination, the LP communications engine may store the received low power communication technology data packets with a level 2 priority level in memory without triggering a wake-up of the managed information handling system according to the described embodiment. Received LWPAN data packets having a status importance priority (level 3) however will neither cause the managed information handling system to be awoken from a sleep state for forwarding the received low power communication technology packets nor will the received low power communication technology packets be stored in memory. Instead, received level 3 low power communication technology packets in the example embodiment at 6% battery power will be discarded according to an example embodiment.

Proceeding to 545, the LP communications engine will receive an indication that the managed information handling system has been awoken from a sleep state by another trigger waking the system from a sleep state. For example, a user may wake the system or a later critical priority low power communication technology data packet may have been received. Upon receipt of an indication that the managed information handling system has been awoken, the LP communications engine will forward the received low power communication technology data packets that were stored in memory to the in-band or out-of-band remote management application they were destined for. Thus, according to the described example embodiment in accord with Table 2, the stored level 2 low power communication technology packets may be forwarded to the remote management or security application intended from the cloud agent that transmitted the packets via low power communication technology wireless link.

At this point the process may end although the low power communication technology communications engine will continue to monitor sleep state indicators, power state indications, and low power communication technology communications for determination of passing in-band or out-of-band communications received via the low power communication technology wireless interface adapter. In this way, improved power conservation and power management may be realized while supporting always-on remote management or security solution communications via low power communication technology wireless links according to the embodiments of the present disclosure.

It is understood that the methods and concepts described in the algorithms above for FIGS. 4 and 5 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments. For example, aspects of FIGS. 4 and 5 may be modified as understood by those of skill to implement variations described therein from either figure embodiment.

In some embodiments, dedicated hardware implementations such as application specific integrated circuits, programmable logic arrays and other hardware devices can be constructed to implement one or more of the methods described herein or portions of one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a wireless adapter for communicating on a low power communication technology network for receiving low power communication technology data traffic for at least one always-on remote management service for the information handling system;
   a controller receiving a power status of the information handling system indicating a battery power level and determining a first threshold priority level based on the battery power level;
   the controller executing code instructions for a low power communications engine to detect a first priority level of incoming low power communication technology data traffic to an active low power communication technology wireless link from a packet header designation of priority level;
   the controller to initiate incoming low power communication technology data traffic limitations to deny immediate forwarding the low power communication technology data traffic if the detected first priority level falls at or below the first threshold priority level; and the controller to wake a BIOS of the information handling system and forward the incoming data traffic to applications on the information handling system if the first priority level is above the first threshold priority level.

2. The information handling system of claim 1 wherein the first priority level is one of a plurality of priority levels assigned to data messages by an always-on management service agent ranging from a critical priority level to a status priority level.

3. The information handling system of claim 1, further comprising:
the controller to wake the BIOS of the information handling system and permit the incoming data traffic for the always-on management service to be forwarded to applications when the power status indicates operative coupling to an AC power source at any battery power level.

4. The information handling system of claim 1 wherein the always-on remote management service includes a security service and a highest priority level assigned to low power communication technology data packets is used for critical alert messages pertaining to a security compromise.

5. The information handling system of claim 1 wherein the battery level for a first threshold priority level is at 10% battery power remaining.

6. The information handling system of claim 1 wherein if the first priority level falls below the threshold priority level the low power communications engine discards the incoming low power communication technology data traffic.

7. The information handling system of claim 1, further comprising:
a memory to store incoming low power communication technology data traffic data when the low power communications engine initiates the incoming low power communication technology data traffic limitations when the first priority level falls at or below the first threshold priority level; and
the low power communications engine to forward the low power communication technology data traffic stored in memory to applications when the information handling system next wakes from a sleep state.

8. The information handling system of claim 1 wherein wireless adapter receives incoming low power communication technology data traffic via the active low power communication technology wireless link from a remotely located agent of the always-on remote management service.

9. A computer implemented method comprising:
receiving low power communication technology data traffic for at least one always-on remote management service for an information handling system via a wireless adapter operating via a low power communication technology wireless link;
assessing a power status condition of an information handling system, via a processing logic executing code instructions for a low power communication technology communications engine, indicating a battery level and applying a first threshold priority level based on the battery level for initiating incoming low power communication technology data traffic limitations;
detecting a first priority level from packet headers of incoming low power communication technology data traffic and
initiating the incoming low power communication technology data traffic limitations if a detected first priority level is below the first threshold priority level, wherein the low power communication technology data traffic limitations prohibit the incoming low power communication technology data traffic from proceeding to remote management applications on the information handling system; and
forwarding the low power communication technology data traffic to remote management applications and waking the information handling system from a sleep state if the first priority level is at or above the first threshold priority level.

10. The method of claim 9, further comprising:
storing in a memory the low power communication technology data traffic subject to the incoming low power communication technology data traffic limitations prohibited from proceeding the remote management applications on the information handling system by the low power communication technology communications engine; and
forwarding the low power communication technology data traffic stored in memory to the remote management applications at a later time when the information handling system next wakes from a sleep state.

11. The method of claim 9 wherein the first threshold priority level is applied when battery power level remaining is 15% or less.

12. The method of claim 9 wherein the first priority level assigned to incoming low power communication technology data traffic by a remotely located agent of the always-on remote management service is selected from a plurality of priority levels assigned to remote management service data packets transmitted to managed information handling systems.

13. The method of claim 9, further comprising:
discarding the incoming traffic data subject to the incoming low power communication technology data traffic limitations by the low power communication technology communications engine when the first priority level is below the threshold priority level.

14. The method of claim 9, further comprising:
applying a second priority threshold level for the battery power level;
storing the low power communication technology data traffic in memory if the detected first priority level is at or above the second priority threshold level; and
discarding the low power communication technology data traffic if the detected first priority level is below the second threshold priority level.

15. The method of claim 9, wherein the low power communication technology wireless link is an LTE Category Machine 1 (LTE Cat M1) wireless link.

16. An information handling system comprising:
a wireless adapter for communicating on a low power communication technology network for receiving low power communication technology data traffic for at least one always-on remote management service for the information handling system;
a remote management card executing code instructions for a low power communications engine and receiving a power status of the information handling system indicating a battery power level and applying a first threshold priority level from an low power communication technology data traffic limitation policy based on the battery power level;
the low power communications engine to detect a first priority level of incoming low power communication technology data traffic to an active low power communication technology wireless link from a packet header designation of priority level;

the low power communications engine to initiate incoming low power communication technology data traffic limitations to deny immediate forwarding the low power communication technology data traffic if the detected first priority level falls at or below the first threshold priority level; and the low power communications engine to wake a BIOS of the information handling system and forward the incoming data traffic to applications on the information handling system if the first priority level is above the first threshold priority level.

17. The information handling system of claim 16, further comprising:

the low power communications engine to not apply low power communication technology data traffic limitations when the power status indicates operative coupling to an AC power source or the battery power level is above the 40% remaining battery power.

18. The information handling system of claim 16 wherein the low power communication technology protocol for receiving low power communication technology data traffic is via an LTE Category Narrow Band 1 (LTE NB-IoT) wireless link.

19. The information handling system of claim 16 wherein a detected first priority level is one of a plurality of priority levels assigned to data messages by an always-on management service agent ranging from a highest priority level to a lowest priority level.

20. The information handling system of claim 19, wherein the plurality of priority levels includes four priority levels assigned by the always-on remote management service to data packets transmitted to managed information handling systems through the low power communication technology.

* * * * *